United States Patent
Schmidt et al.

(10) Patent No.: US 8,299,662 B2
(45) Date of Patent: Oct. 30, 2012

(54) MOTOR CONNECTING BOX AND CONVERTER MOTOR

(75) Inventors: Josef Schmidt, Graben-Neudorf (DE); Jürgen Böckle, Bruchsal (DE); Sven Tesch, Ubstadt-Weiher (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 399 days.

(21) Appl. No.: 12/670,475

(22) PCT Filed: Jul. 8, 2008

(86) PCT No.: PCT/EP2008/005562
§ 371 (c)(1),
(2), (4) Date: Jan. 25, 2010

(87) PCT Pub. No.: WO2009/012883
PCT Pub. Date: Jan. 29, 2009

(65) Prior Publication Data
US 2010/0237722 A1    Sep. 23, 2010

(30) Foreign Application Priority Data
Jul. 24, 2007  (DE) .......................... 10 2007 034 915

(51) Int. Cl.
*H02K 9/00*  (2006.01)
(52) U.S. Cl. .......................................... 310/52; 310/71
(58) Field of Classification Search ............... 310/52, 310/71, 68 D, 89, 91
See application file for complete search history.

(56) References Cited

U.S. PATENT DOCUMENTS

| | | | | |
|---|---|---|---|---|
| 4,451,750 | A | * | 5/1984 | Heuer et al. ................... 310/88 |
| 4,475,873 | A | * | 10/1984 | Jensen et al. ................. 417/422 |
| 5,613,844 | A | * | 3/1997 | Tuckey et al. ................ 417/366 |
| 5,766,026 | A | * | 6/1998 | Cooper et al. ............... 439/76.1 |
| 6,099,325 | A | | 8/2000 | Parkhill |
| 6,198,183 | B1 | * | 3/2001 | Baeumel et al. ................ 310/52 |
| 6,873,076 | B2 | * | 3/2005 | Kaeufl et al. .................... 310/91 |
| 7,140,090 | B2 | * | 11/2006 | Williams et al. ................ 29/596 |
| 7,517,257 | B2 | | 4/2009 | Handwerker |
| 7,973,439 | B2 | * | 7/2011 | Watanabe et al. ............... 310/71 |
| 7,989,997 | B2 | * | 8/2011 | Hashimoto et al. ......... 310/68 D |

(Continued)

FOREIGN PATENT DOCUMENTS

DE    1 284 505    12/1968

(Continued)

OTHER PUBLICATIONS

European Office Action, dated Sep. 9, 2010, issued in corresponding European Patent Application No. 08784653.1.

(Continued)

*Primary Examiner* — Thanh Lam
(74) *Attorney, Agent, or Firm* — Kenyon & Kenyon LLP (57) ABSTRACT

In a converter motor, the converter electronics are integrated into the motor connecting box. The lower part of the motor connecting box is formed in one piece with a housing of the converter motor and at the front end than at the rear end. The edge of the upper part of the motor connecting box is shaped appropriately slantwise, so that the upper side is aligned to be straight. Connecting cables for power current and data communications issue from a stepped gradation in the upper part. The upper part has a plurality of openings for passing through cables which are oriented at an angle of less than 90° to one another and to the motor axis.

22 Claims, 7 Drawing Sheets

U.S. PATENT DOCUMENTS

| | | |
|---|---|---|
| 2009/0026893 A1 | 1/2009 | Zisler et al. |
| 2009/0102284 A1 | 4/2009 | Schmidt |

FOREIGN PATENT DOCUMENTS

| | | |
|---|---|---|
| DE | 7 342 532 | 3/1974 |
| DE | 197 06 188 | 8/1998 |
| DE | 103 39 340 | 4/2005 |
| DE | 10 2004 036 281 | 11/2005 |
| DE | 10 2004 039 682 | 3/2006 |
| DE | 10 2004 048 461 | 4/2006 |
| DE | 10 2005 022 367 | 11/2006 |
| DE | 10 2005 041 136 | 3/2007 |
| EP | 0 858 146 | 8/1998 |

OTHER PUBLICATIONS

International Search Report, issued in corresponding International Application No. PCT/EP2008/005562 filed Jul. 8, 2008.

International Preliminary Report on Patentability, issued in corresponding International Application No. PCT/EP2008/005562 filed Jul. 8, 2008.

* cited by examiner

MOTOR CONNECTING BOX AND CONVERTER MOTOR

FIELD OF THE INVENTION

The present invention relates to a motor connecting box and a converter motor.

SUMMARY

A converter motor includes, e.g., an electrically operated drive unit which includes at least one motor unit and an electronic subassembly, the converter unit, for controlling the motor unit, particularly for regulating the rotational speed and/or the torque. The motor unit may include, in this connection, a permanent-magnet rotor, a squirrel-cage rotor or a combination of the two, or may be arranged as an external-rotor motor.

Example embodiments of the present invention to refine a converter motor, improving the heat dissipation being intended.

Important features of a motor connecting box are that a lower part and an upper part are provided, a step being formed in the upper part which includes two plateau surfaces and an end face connecting the plateau surfaces, and in whose end face, openings are arranged for cable bushings. Consequently, a possibility is created of guiding the connecting cables of a converter motor into the motor connecting box, in which the cable bushing is protected on the housing in a plurality of directions by projecting housing parts. The arrangement of a step offers the additional advantage that connecting devices, such as cable glands, connection sockets or connection plugs do not project, or do not project extensively beyond the structural dimensions of the connecting box. Consequently, for one thing, a more compact overall structural dimension is achieved, and for another thing, a more certain protection of sensitive parts from impact damage is achieved.

In example embodiments, the step has a plane of symmetry, openings for cable bushings being provided on both sides of the plane of symmetry. The plane of symmetry preferably reflects the position of the motor axis when the motor connecting box is in the mounted state. The advantage in this context is that a flexible cable routing is practicable, depending on requirements, openings on both sides of the plane of symmetry being used for cable bushings, or being closed unused.

In example embodiments, the openings for cable bushings point away from the plane of symmetry. Consequently, it is advantageously achieved that the angular ranges which are covered by each opening in each case, limited by the bending radius of the connecting cables, overlap and complement one another. Thus, in particular a cable routing laterally away from the plane of symmetry is possible, that is, away from the motor axis. The motor connecting box does not have to be re-positioned for this.

In example embodiments, a first opening for cable bushings is provided in a first planar area of the end face of the step, the mathematical extension of the first planar area intersecting at least two lateral surfaces of the lower part. This states a simply producible arrangement of the openings, which makes possible a cable routing to two sides of the motor connecting box, by having the mounting surface cutting off a corner of the motor connecting box in a slantwise manner.

In example embodiments, a second opening for cable bushings is provided in a second planar area of the end face of the step, the mathematical extension of the first planar area intersecting at least two lateral areas of the lower part and the mathematical extension of the first planar area. Consequently, the opposite side of the motor connecting box is advantageously usable for laying the cable.

In example embodiments, an upper edge is provided on the lower part, which runs diagonally from a higher end to a lower end, the slanting of the upper edge of the lower part and the step in the upper part having a diminishing height in the same direction. The difference in height, which comes about due to the arrangement of the step, is thus at least partially usable for the one-sided superelevation of the connecting box base. Consequently, components such as coils or capacitors, which require a minimum insertion height, are protected by the connecting box base even when the cover has been removed, while no unnecessary installation space is given away in regions having small part electronic components. In addition, the height of lift of the cover is shortened when it is lifted off.

In still another advantageous embodiment example embodiments, a third opening for cable bushings in a third planar area is provided in the end face of the step, the third opening having a lesser diameter than the second opening and the first opening. This provides the possibility of an additional cable bushing for communication cable. Since these cables are considerably thinner in application cases than the power cables, a smaller bending radius is optional during the laying of the cable. The third planar area is preferably situated between the first planar area and the second planar area. It is therefore not necessary to provide openings in a plurality of directions. This saves production steps and improves the sealing.

In example embodiments, the first planar area and the second planar area include an angle whose apex points in the direction of the diminishing height of the step. It is of advantage, in this context, that a region facing away from the drive side of the motor is accessible to the cable routing.

In example embodiments, the included angle has an angular aperture between 60° and 100°. The angular aperture of the included angle preferably amounts to 80°. Consequently, advantageous geometric relationships are set, using which the covering of an angular range of more than 270° is usable for cable routing.

In example embodiments, converter electronics are provided on the inside of the box. Because of the arrangement of openings of the cable bushings situated slantwise to one another, the motor connecting box does not have to be re-positioned for a changed cable routing. Therefore, the motor connecting box is not limited to a square or, more generally, n-cornered base shape, that is, a base shape having a more than binary rotational symmetry, but may extend rectangularly, for example, over the entire length of a motor housing. There is thus sufficient space for providing converter electronics, and the motor connecting box is equipped for the integration of a compact converter motor.

In example embodiments, the converter electronics includes a power component, and, at the bottom of the lower part, a planar contact area is provided, the power component being laid upon the contact area for the heat dissipation. One advantage, in this context, is that the housing of the motor connecting box is usable for the heat dissipation of the power components, especially the IGBT's, which, as converter output stage, take over control of a motor. Thus, a large cooling surface is made available, which is able to be connected to additional cooling surfaces.

In example embodiments, the power component is situated on a printed circuit board, the printed circuit board pressing the power component onto the contact area. This has the advantage that, for mounting the converter, in a first step the printed circuit board is soldered, and in a second step, the printed circuit board is inserted into the housing. The fastening of the power component takes place directly with the insertion. Additional mounting steps, such as the mounting of a holding-down clamp, may be omitted.

In example embodiments, a fastening frame is provided, to which the printed circuit board is fastened, and which covers the printed circuit board from above, openings being provided, in the fastening frame, through which plug contact parts of the printed circuit board extend. The advantage is that devices are provided as a mounting aid, to protect the printed circuit board from damage. The fastening frame is also filled up with a heat-conducting molding compound, which gives rise to a heat dissipation of the entire electronics system to the bottom of the motor connecting box.

In example embodiments, the fastening frame is screwed together with the lower part, the fastening frame pressing the printed circuit board against the bottom of the lower part, when it is in the snapped-in or screwed-in state. An elastomeric cushion is preferably situated between the power components and the printed circuit board. Consequently, the contact force of the fastening screws for the fastening frame are used for pressing the power components against the contact area.

In example embodiments, the fastening frame has a rim, an additional printed circuit board being clipped onto the rim. Springy tabs having lugs are preferably provided on the rim, onto which the additional printed circuit board is clipped. This makes available a compact electronics component, the first printed circuit board and the additional printed circuit board being mounted before the insertion of the fastening frame into the lower part. The dual design of the electronics system also makes possible the modular exchange of the upper part, that is, the additional printed circuit board, having a rectifier and intermediate circuit, for an alternative embodiment without rectifier, for example. For, a rectifier may be omitted in the case of a contactless power supply according to German Published Patent Application No. 10 2005 022 367. All the features described there of a contactless power supply are taken up as a component of this description.

In example embodiments, the additional printed circuit board is connected to the plug connector of the first printed circuit board via a fitting plug connector. Consequently, the electronic component made up of fastening frame, first printed circuit board and additional printed circuit board is able to be mounted by being clipped on. The plug connectors are preferably positioned on the printed circuit boards in such a way that they are connected when the clipping on takes place. Soldering them together is thus no longer required. During maintenance, individual components are easily exchanged.

In example embodiments, an intermediate circuit capacitor and/or a rectifier module is situated on the additional printed circuit board, in a region that is surrounded at least partially by the higher end of the lower part. The step in the upper part, on the inside of the motor connecting box, preferably forms and surrounds a region in which an intermediate circuit capacitor and/or a rectifier module of the converter electronics is or are situated. Thus, the enclosed installation space formed by the step is utilized for those components that require much space, especially in height. The base of the motor connecting box surrounds these components and protects them even when the cover is removed.

The rectifier module and/or the intermediate circuit capacitor are provided as options in example embodiments. The rectifier module and the intermediate circuit module are preferably included in one supply module, for instance, mounted on a common printed circuit board that is separate from the power output stage. In example embodiments, the power output stage of the converter electronics is connected directly to the output of a rectifier module of the matching controller of a system for contactless energy supply, as described in German Published Patent Application No. 103 39 340, for example. Thus a model series of converter motors having different functualities is formed.

In example embodiments, an outer tube-shaped part is provided on the lower part, for accommodating a motor unit, the bottom of the lower part forming a part of the first tubular part. Consequently, the power semiconductors are connected to a housing part acting as a large cooling body.

In example embodiments, an inner tube-shaped part is provided in the outer tube-shaped part for the accommodation of the stator of a motor unit, the axis of the outer tube-shaped part extending parallel to the axis of the inner tube-shaped part. Tube-shaped designates in general a part that is arranged substantially discretely or continuously rotationally symmetrical about an axis, is hollow on the inside and is provided overall with a wall thickness that is thin as compared to its diameter.

In example embodiments, the slanting of the upper edge of the lower part has a diminishing height in the direction of the axis of the first tube-shaped part. This has the advantage that the openings for the cable bushings are able to be positioned in such a way that an angular range is covered which includes both sides of the motor and the back side, that is, the side facing away from the drive side. The drive side of the motor connecting box, that is in any case not usable for cable bushings, is thus usable for the accommodation of the large part components, such as capacitors and/or coils and/or transformers of the converter.

In example embodiments, the lower part and the outer tube-shaped part are produced from one cast body. The arrangement from one cast body becomes possible since the motor connecting box does not have to be re-positioned in spite of a flexible cable routing possibility. An advantageous heat dissipation is thus achieved, since plug connectors, or other connections that could act as a heat barrier, are completely omitted.

In example embodiments, the outer tube-shaped part and the inner tube-shaped part are produced from one cast body, the two parts being connected via radially extending crosspieces. A complex motor housing is thus provided which has space for a converter, which is jointly cooled by the self-ventilator of a motor. The arrangement of the two housing parts that are interspersed with each other offers the advantage of large cooling areas for the motor and the converter, which, in addition, are thermally decoupled from each other.

Among features of a converter motor are that an inner tubular part is provided, which surrounds the stator, and an outer tubular part is provided which surrounds the inner tubular part, and at whose outer side the motor connecting box is provided, a ventilator being provided in the outer tubular part which moves air along the inside of the outer tubular part. The cooling air between the motor unit and the converting unit advantageously causes a thermal decoupling of the two units. Thus the heat dissipation is improved. The step in the upper side of the motor connecting box advantageously makes a flexible cable routing possible, without one's having to rotate or displace the motor connecting box. The motor connecting box and the motor housing may accordingly be produced from one cast body. Unfavorable heat transitions because of connecting points drop out. In addition, production is simplified.

In example embodiments, the slanting of the upper edge of the lower part has a diminishing height in the direction of the axis of the outer tubular part, the region of great height being situated on the drive side of the converter motor. The motor connecting box preferably extends over the entire axial length of the motor housing. Consequently, the converter electronics are able to be integrated into the motor housing at as small as possible an installation measurement.

In example embodiments, the motor shaft is situated in the plane of symmetry of the motor connecting box. Thus, the converter motor is able to be connected symmetrically.

Further features and aspects of example embodiments of the present invention are described below.

LIST OF REFERENCE NUMERALS 1 converter motor
2 outer housing
3 stator housing
4 end shield A
5 drive flange
6 ventilator cover
7 connecting box
8 connecting box base
9 connecting box cover
10 bolt
11 recessed grip
12 cable gland
13 cable gland
14 crosspiece
15 motor shaft
16 cable passage opening
17 upper side of cover
18 shoulder
19 screw plug
20 end face
21 end face
22 planar area
23 screw plug
24 cover edge
25 centrifugal brake lever
26 self-ventilator
27 opening
28 base edge
29 front base part
30 rear base part
31 connecting box bottom
32 power component
33 contact area
34 air channel
35 printed circuit board
36 fastening frame
37 tab
38 plug connection
39 plug connection
40 lug
41 reinforcement rib
42 lug
43 planar area
44 lateral surface
45 lateral surface
46 lateral surface
47 step
48 rim
49 intermediate circuit capacitor
50 plug connector
51 connecting channel
60 connecting box
61 plateau surface
62 plateau surface
63 plane of symmetry
64 opening
65 opening
66 opening
67 opening
68 end face
69 lateral surface
70 lateral surface
80 printed circuit board
81 printed circuit board
82 USB (universal serial bus) connection
83 plug connector
84 rectifier stage
85 intermediate capacitor
90 opening
91 cable gland
92 cable gland
93 cap
94 cap
95 cable gland
96 cap

DETAILED DESCRIPTION

Figure 1:
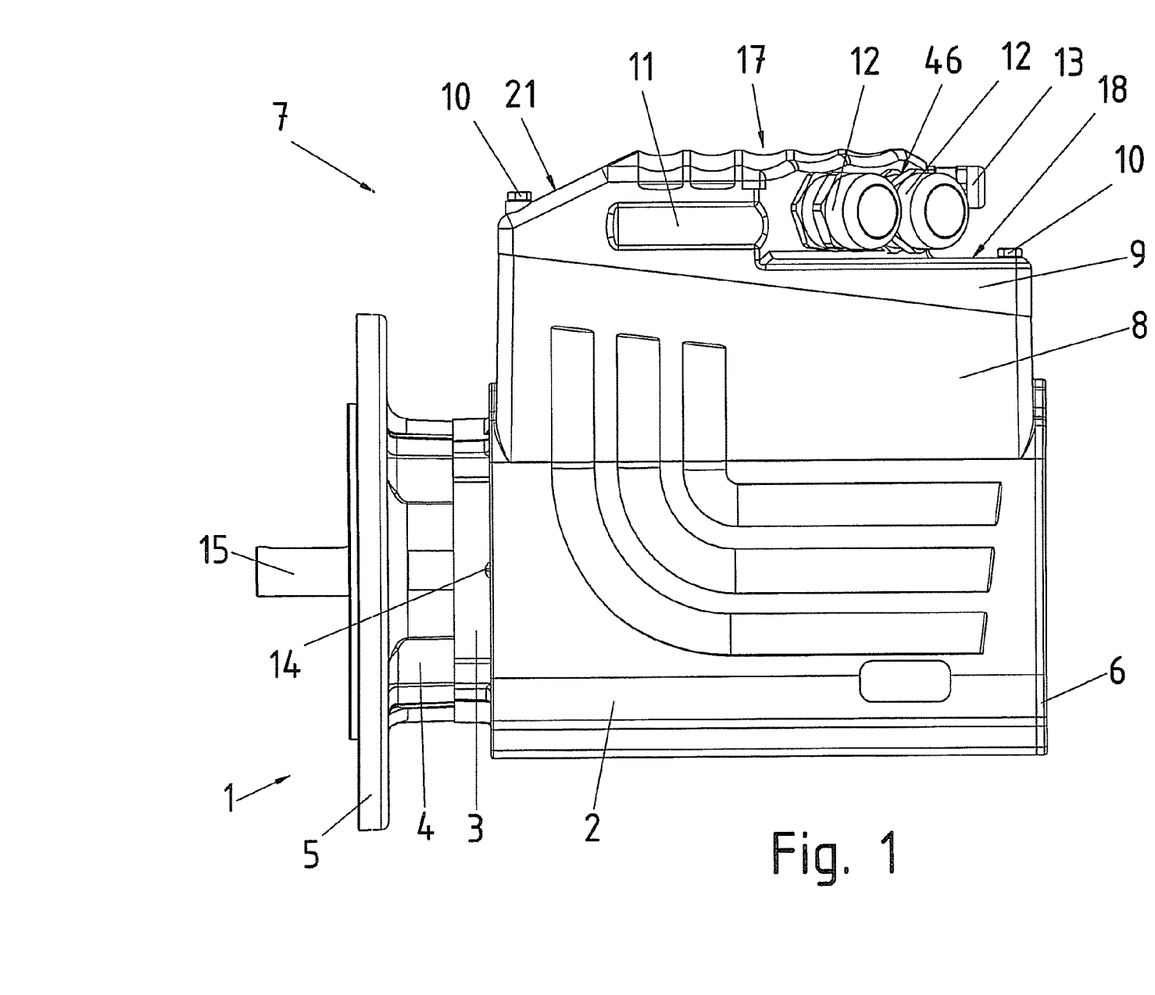
FIG. 1 illustrates a converter motor having a motor connecting box.

FIG. 1 shows a converter motor 1 in a side view. A tubular outer housing 2 coaxially surrounds a tubular inner housing 3. Inner housing 3 includes the motor unit of converter motor 1. The stator of the motor unit is situated in inner housing 3, and is held by the latter in a force-locking manner. Inner housing 3 is closed off on the drive side of the motor unit by an end shield A 4, which goes over into a drive flange 5. The drive side of motor shaft 15 extends all the way through drive flange 5 for connection to an input shaft of a gearing. At the opposite end of converter motor 1, outer housing 2 is closed off by a ventilator cover 6 in a grid-like manner.

Inner housing 3 is rigidly connected to outer housing 2 via crosspieces 14. Inner housing 3 and outer housing 2 are made of a common casting. Aluminum is preferably selected as the material.

On the upper side of outer housing 2 there is a connecting box 7. Connecting box 7 includes an upper part arranged as connecting box cover 9, which is mounted upon a lower part, the lower part being formed of a connecting box base 8 and a region of outer housing 2. Connecting box base 8 is arranged as one piece with outer housing 2, and it surrounds a region of outer housing 2 which forms the bottom of connecting box 7.

Connecting box cover 9 is fastened on the connecting box base by screws 10.

Connecting box base 8 has an obliquely extending upper edge, whose height above outer housing 2 is higher on the drive side than at the opposite end of converter motor 1. A slanting having a downward height curve is thus provided which diminishes along the motor axis, away from the drive side. Connecting box cover 9 has a corresponding slant. In particular, the angles of the slanting with respect to the side walls are the same for the lower part and the upper part, so that the side walls go over into one another in a substantially even manner.

In the upper region of connecting box cover 9, a step is provided, which is formed by upper side of cover 17 and a shoulder 18, as well as a side area connecting the two areas.

Upper side of cover 17 and shoulder 18 thus each define a plateau of different heights, shoulder 18 being terraced compared the upper side of the cover. Because of the step, a vertical run is formed, which extends in the same direction as the slanting at connecting box base 8, in a falling-off manner. The step includes a lateral surface 46, on which cable glands 12, 13 are situated for sealing cable bushings.

At opposite sides of connecting box cover 9, in each case an axially extending recessed grip 11 is provided, using which connecting box cover 9 may lifted off. On the front side of connecting box cover 9 there is also provided a planar beveling 21 which goes over into upper side of cover 17.

Figure 2:
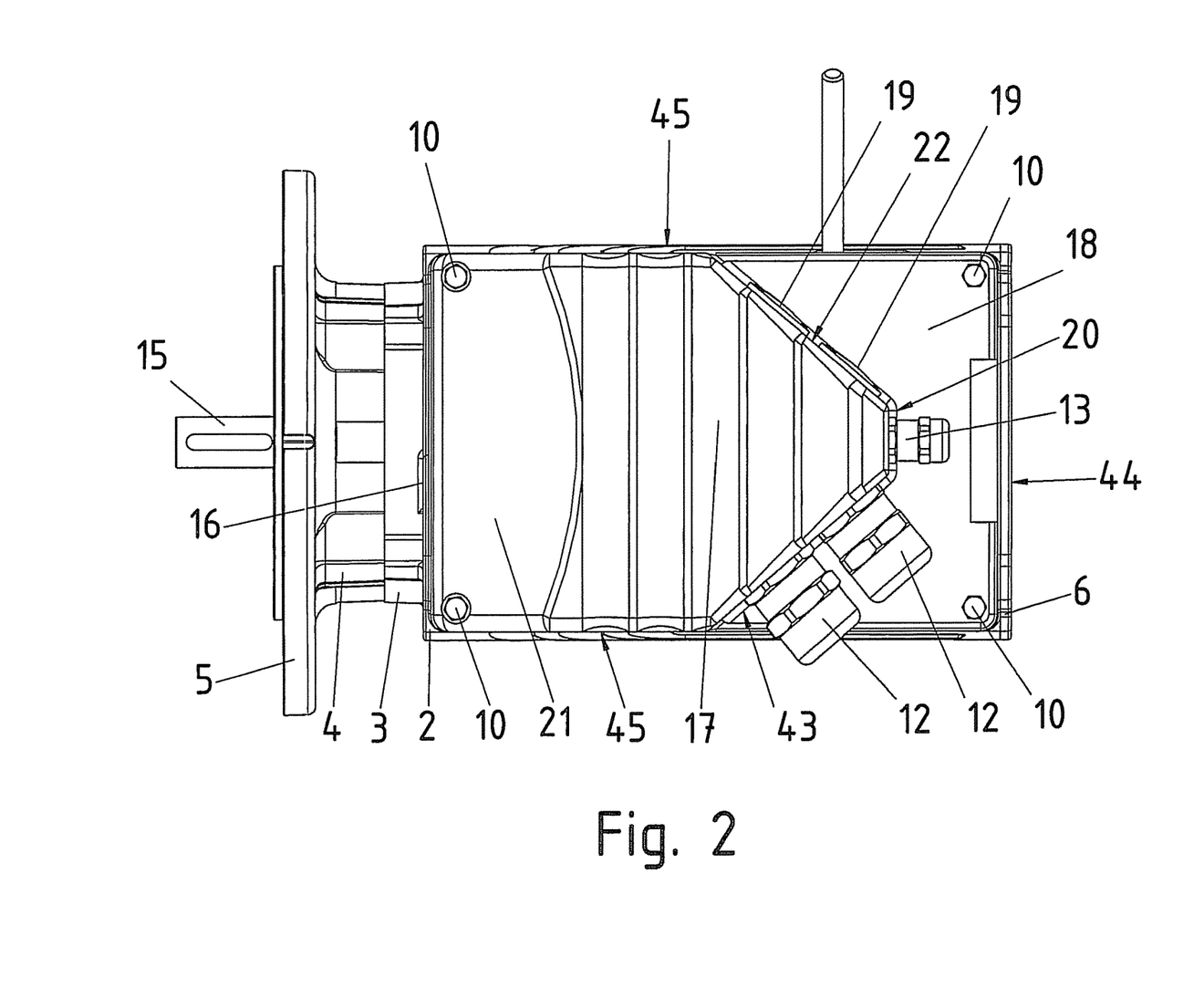
FIG. 2 is a view of the converter motor illustrated in FIG. 1 from above.

FIG. 2 shows converter motor 1 from above. Inner housing 3 is connected to outer housing 2 via a cable passage opening 16. Cable passage opening 16 is used for leading through the connecting cable from the connecting box to the motor unit.

Upper side of cover 17 is bordered by beveling 21, two lateral surfaces 45 and the end face of the step that is formed by planar areas 22, 43 and end face 20. In planar areas 22, 43 two openings respectively are applied for cable bushings, which are able to be closed by screw plugs 19 or by cable glands 12.

First planar area 22 is situated slantwise to the sides of connecting box base 8. The mathematical plane ideally defined by planar area 22 intersects two lateral surfaces 44, 45 of connecting box base 8. As a sectional plane, the mathematical plane would cut off a corner of the base area of the lower part. Because of the slantwise extending arrangement of the openings for the cable bushings, a cable is able to be brought out into various directions from the connecting box, without re-positioning the connecting box. Because of the step, the area around the openings is protected by projecting housing along the motor axis and transversely to the motor axis, whereby the strain on the cable routing is relieved.

The lateral surface of the step includes a second planar area 43, in which two additional openings have been applied for the cable bushing. These opening are closed by cable glands 12 that are screwed in. Cable glands 12 also fit the openings in first planar area 22. The mathematical plane ideally defined by second planar area 43 intersects two lateral surfaces 44, 45 of connecting box base 8. As a sectional plane, the mathematical plane would cut off a corner of the base area of the lower part. Second planar area 43, together with first planar area 22, includes an angle whose angular aperture amounts to 80°. Consequently, the second planar area covers a semicircle of possible cable routings originating from the openings, which has only a section in common with the corresponding semicircle of the first planar area. The possible cable routings thus cover a segment having an angular aperture far greater than 180°, without the connecting cable having to be bent or buckled too much.

Between first planar area 22 and second planar area 43 a third planar area is situated, in the form of an end face 20, in which an opening is provided whose diameter is less than that of the openings in first planar area 22. The opening is accordingly closed, using a cable gland 13 which is smaller than cable gland 12. Cable gland 13 is dimensioned exactly so that it is able to accommodate a cable for data communication. Cable glands 12 are dimensioned in such a way that in each case they are able to accommodate a cable for power current for supplying a motor in the kW range. Since a cable for data communications is substantially thinner than a power current cable, it is easier to bend it. Thus, appropriate openings in different directions do not necessarily have to be provided.

Figure 3:
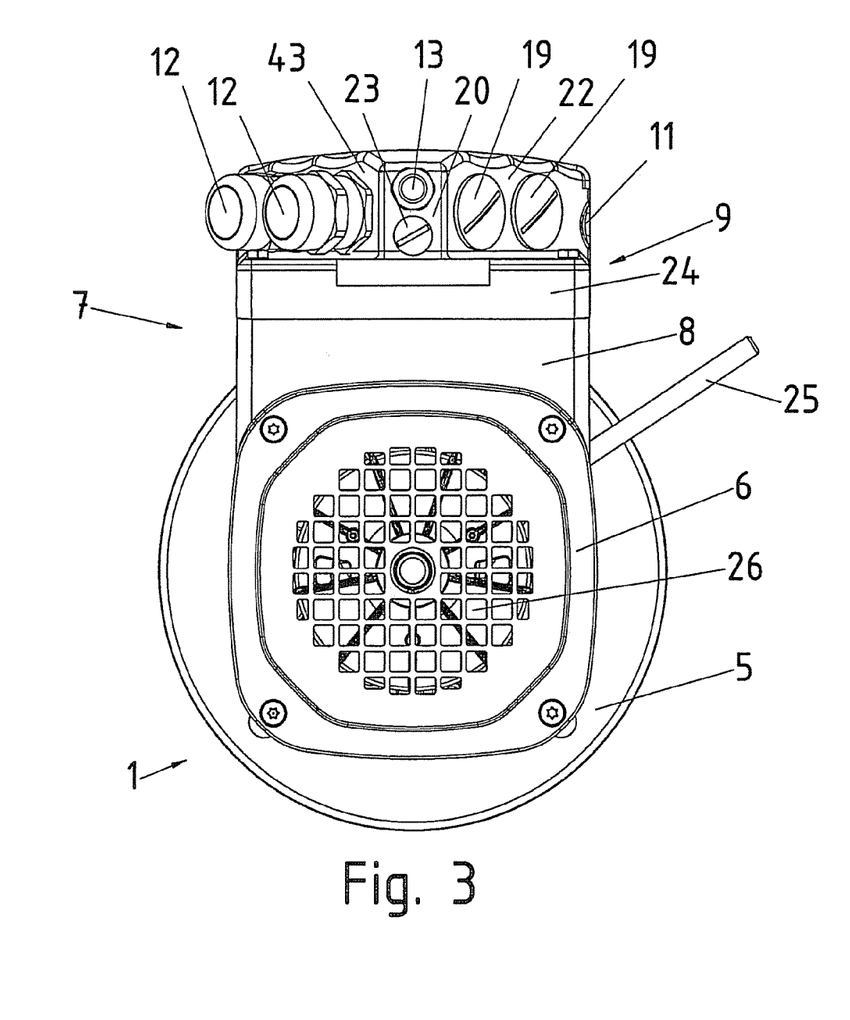
FIG. 3 is a view of the converter motor illustrated in FIG. 1.

FIG. 3 shows a converter motor 1 from behind, that is, from the side that is opposite to the drive side. Under ventilator cover 6, a ventilator 26 is situated. Ventilator 26 is arranged either as a self-ventilator or as an extraneous ventilator. It sucks in air through open-worked ventilator cover 6 and blows it through the intermediate space that is formed by outer housing 2 and inner housing 3. The air thus sweeps over the surface of the inside of the tubular outer housing and eventually exits at an annular opening on the drive side.

An additional bore is applied into end face 20, which is closed by screw plug 23. A cable gland 13 is alternatively able to be screwed into the opening.

Cover edge 24 of the upper part of connecting box 7 has a surface which is substantially aligned with the surface of the side walls of cable gland 8. In this instance, the surfaces of the side walls of connecting box cover 9, particularly of cover edge 24, may protrude slightly, in order to conceal the sealing ring put in between upper part and lower part from liquid running down, and thus to effect greater tightness.

Figure 4:
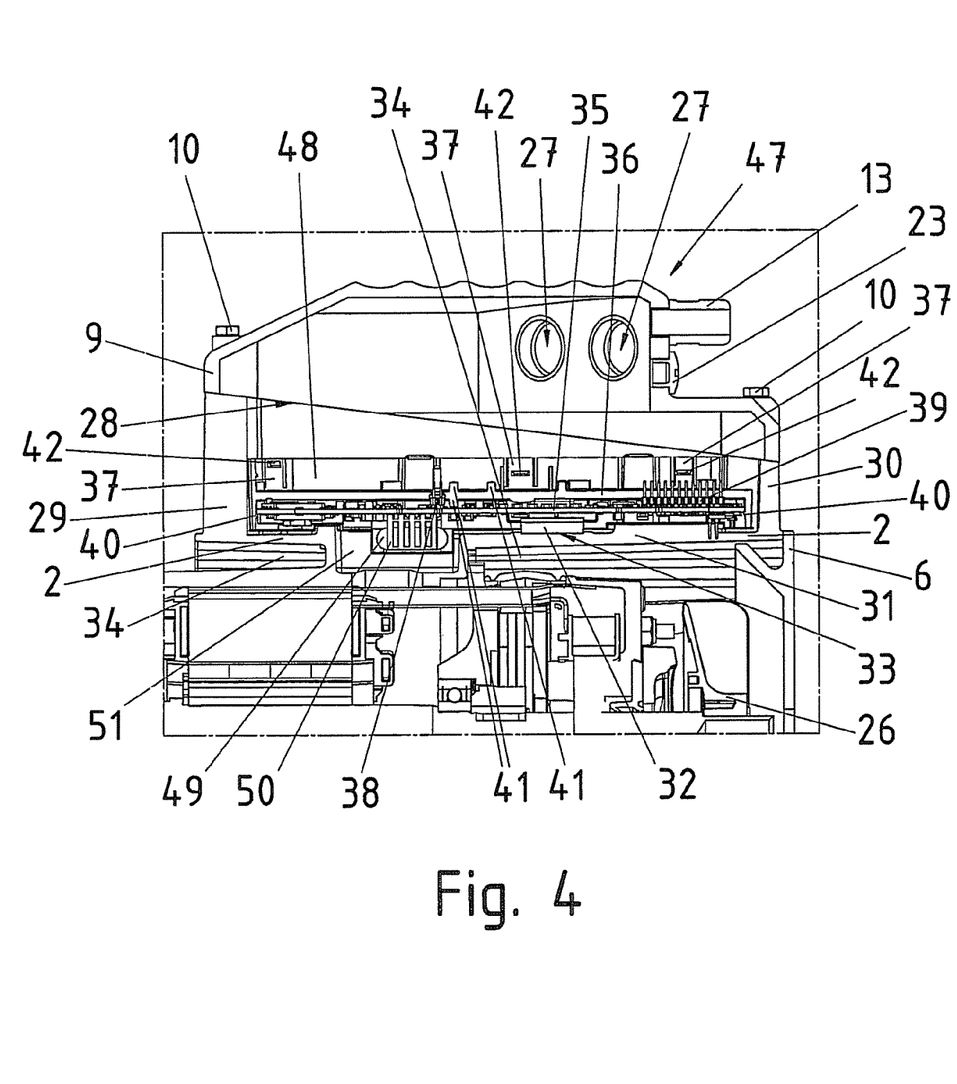
FIG. 4 is a cross-sectional view of the motor connecting box illustrated in FIG. 1.

FIG. 4 shows a section through connecting box 7. Front base part 29 of connecting box base 8 has a greater height as compared to outer housing 2 than compared to rear base part 30. Base edge 28 of connecting box base 8 thus has a slanting having a height dropping off from the drive side of the motor to the ventilator side. Thus, at connecting box cover 9 a step 47 is able to be formed in a space-saving manner, by providing the lower edge of connecting box cover 9 with an appropriate slant. Step 47 includes two plateau areas which each have a substantially constant height above outer housing 2, and an end face which connects the plateau areas and extends substantially perpendicular to motor axis 15. Because of step 47, a cable that is brought out of a cable gland 12, 13 situated at the end face is protected at the exit location by parts of connecting box cover 9. Because of the slanting, the wall, formed to be higher in front base part 29, forms a protection from larger electronics, such as terminal boards or plug connectors to the power current connection in the front part (left part in FIG. 4) of the connecting box inner chamber, while in the back part (right part in FIG. 4) space is created for openings 27 for the cable bushing, at an altogether minimum overall installation space of connecting box 7. In the rear part of connecting box inner space, there is additional space for low height installed electronics, for instance, signal electronics for data communications.

In the connecting box inner space there is situated a printed circuit board 35 having the electronics of the converter. On the lower side of printed circuit board 35, power components 32 are mounted in a row transverse to the motor axis. Power components 32 have a contact area for heat dissipation. These contact areas are placed onto a contact area 33, which are worked into connecting box bottom 31 in a particularly planar manner. Between contact area 33 and power component 32, heat-conducting paste is applied to connecting box bottom 31, for the further improvement of the thermal connection.

The lower part of connecting box 7 is produced from one casting with outer housing 2, and connecting box bottom 31 is a region of outer housing 2 which is cooled on its inside by an air flow driven by self-ventilator 26 in air channel 34. Consequently, the entire surface of the outer housing, which extends in a tubular manner about motor shaft 15, that carries ventilator 26, is usable for heat dissipation. Power components 32 are therefore thermally well coupled to a large surface which, in addition, is swept over by cooling air. One may therefore do without cooling ribs.

Printed circuit board 35 is fastened by lugs 40 to a fastening frame 36. Fastening frame 36 completely covers printed circuit board 35, except for individual apertures for plug connector 38. Fastening frame 36 is screwed together with the bottom of the lower part. Consequently, the electronics are protected from above, that is, from a direction towards the opening of connecting box base 8, against inadvertent touching or damage. After installation in fastening frame 36, printed circuit board 35 is molded with a heat conducting molding compound. This molding compound produces a thermal coupling of additional electronic components of printed circuit board 35 to additional planar contact surfaces in the bottom of the connecting box. Between the molding compound and the bottom, a protective foil is inserted, which is interrupted at the contact surfaces.

Printed circuit board 35 has a plug connector 50 pointing downwards, to which the windings of the motor unit are connected. For this, the connecting lines are guided through a connecting channel 51, which connects the inside space of the connecting box to the inside space of stator housing 3. Connecting channel 51 gives room for accommodating plug connector 50 as well as for accommodating an additional intermediate circuit capacitor 51. This intermediate circuit capacitor 51 is dimensioned smaller than the one provided above fastening frame 36, that is not shown, but is situated closer to power components 32.

Reinforcements 41 extending transversely over the upper side are developed on fastening frame 36. Consequently, the contact force after screwing on the fastening frame is transmittable onto the printed circuit board, and from this, on further to power components 32. The latter are thus pressed against contact area 33 and fixed. With that, good heat dissipation of power components 32 is effected over outer housing 2.

A rim 48 is provided on fastening frame 36, which has tabs 37. An additional printed circuit board for signal electronics and the rectifier and the intermediate circuit capacitor of the converter may be inserted in rim 48. When the additional printed circuit board is inserted, tabs 37 snap into lugs 42, whereby the additional printed circuit board is held in position. The additional printed circuit board is connected electrically to printed circuit board 35 via a fitting plug connector to plug connectors 38. The additional printed circuit board includes a device for the connection of the power current supply of the converter and a device for the connection of the data communications lines. The rectifier unit and the intermediate circuit capacitor are situated on an additional printed circuit board in the left region, and are protected by front base part 29 of connecting box base 8, that is designed to be higher, even when connecting box cover 9 is taken off.

Figure 5:
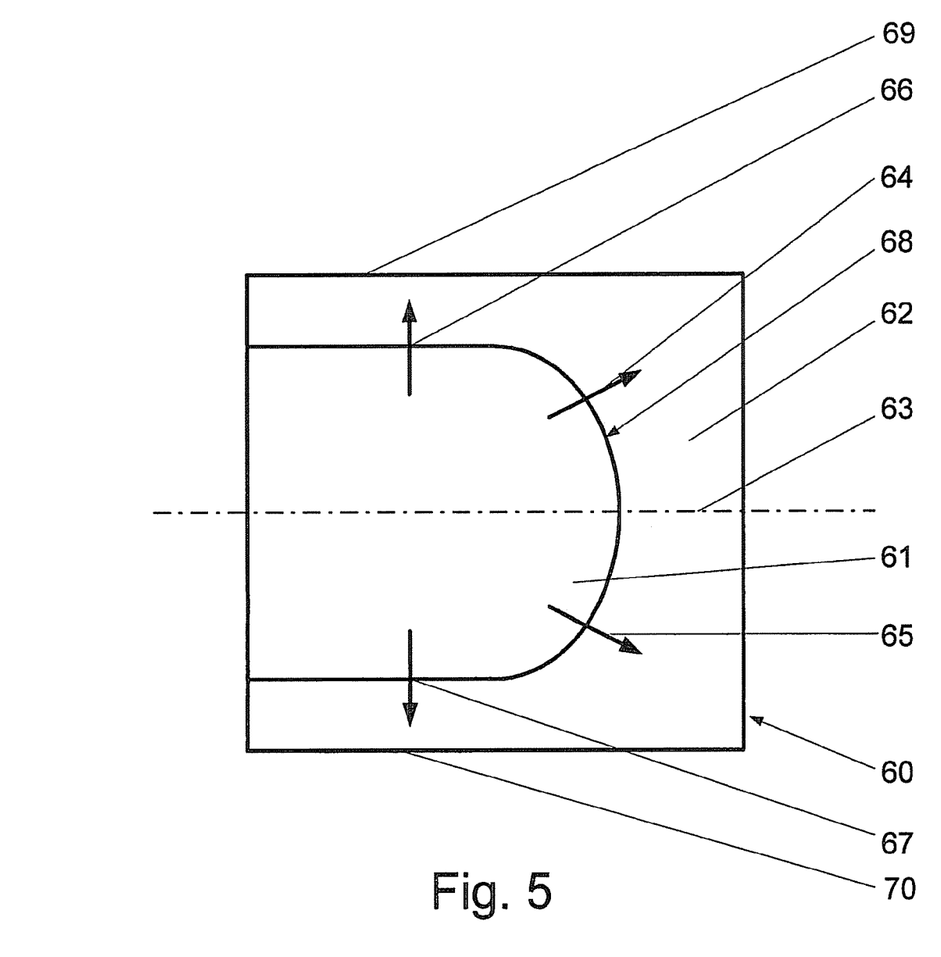
FIG. 5 illustrates a motor connecting box.

FIG. 5 shows a schematic view of an additional connecting box 60, as seen from above. A first plateau surface 61 and a second plateau surface 62 are separated by a bow-shaped end face 68. Second plateau surface 62, in this instance, is set down further compared to first plateau surface 61, and is thus farther away from the observer. Plateau surface 61, 62 and end face 68 form a step. At the ends of the bow-shaped region, end face 68 is guided parallel to side area 69, 70 of connecting box 60. In end face 68 openings 64, 65, 66, 67 are provided for the cable passage opening into the inside of connecting box 60.

Openings 64, 65, 66, 67 each have a direction of opening symbolized by arrows. Connecting box 60 has a plane of symmetry 63, from which openings 64, 65, 66, 67 in each case point away in their directions of opening. Openings 64, 65, 66, 67 each offer the possibility of having a cable passage opening that is protected by second plateau surface 62 and the height of end face 68.

Figure 6:
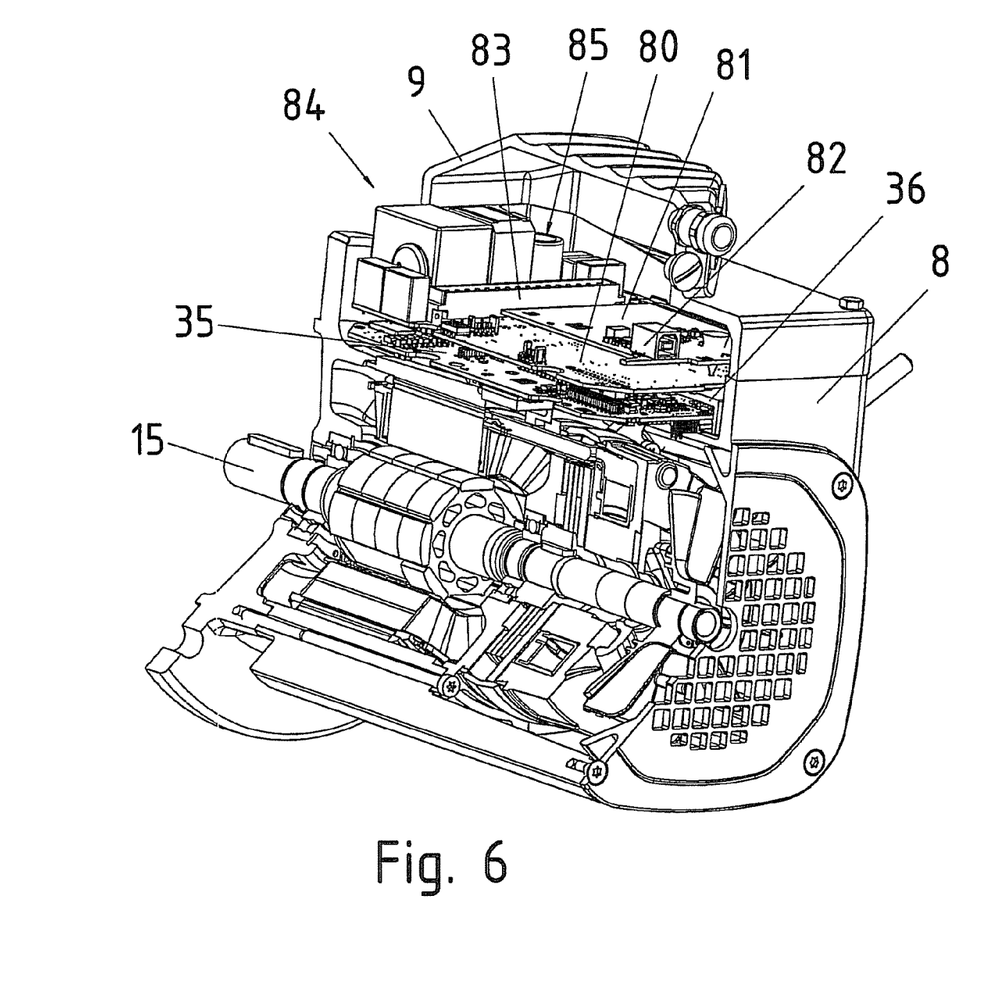
FIG. 6 is a cross-sectional view of a converter motor having an optional rectifier unit and an optional intermediate circuit unit.

FIG. 6 shows a sectional view of the converter motor of FIG. 1, having additional electronic options inside the motor connecting box.

On fastening frame 36, printed circuit board 35, having the power electronics for motor control, is mounted on the lower side. An additional printed circuit board 80 is mounted on the upper side of fastening frame 36. On this printed circuit board 80 there are situated at least one control electronics (not shown) for bus communication, a plug connector 83, a rectifier unit 84 of the converter and an intermediate circuit capacitor 85.

Rectifier unit 84 and intermediate circuit capacitor 85 are designed for voltages of 400 V and more and for high current strengths of 1 A and more, and therefore they have increased structural dimensions. Thus, additional internal space made available by the step in connecting box cover 9 is utilized.

Plug connector 83 is arranged to fit an additional plug connector (not shown) on the inside of connecting box cover 9. This additional plug connector is plugged into plug connector 83 by the mounting of connecting box cover 9 onto connecting box base 8. Consequently, the connecting line of the converter motor is able to be connected to the additional plug connector via cable terminals.

A third printed circuit board 81 is connected to printed circuit board 80, preferably via a plug connection, whose plug connectors are soldered firmly onto respective printed circuit boards 80, 81. Third printed circuit board 81 is used for reading out motor variables, especially operating measured variables, which are able to be read out for diagnosis via an USB connection 82. Alternatively, an IR interface or another standard plug connector is provided.

Figure 7:
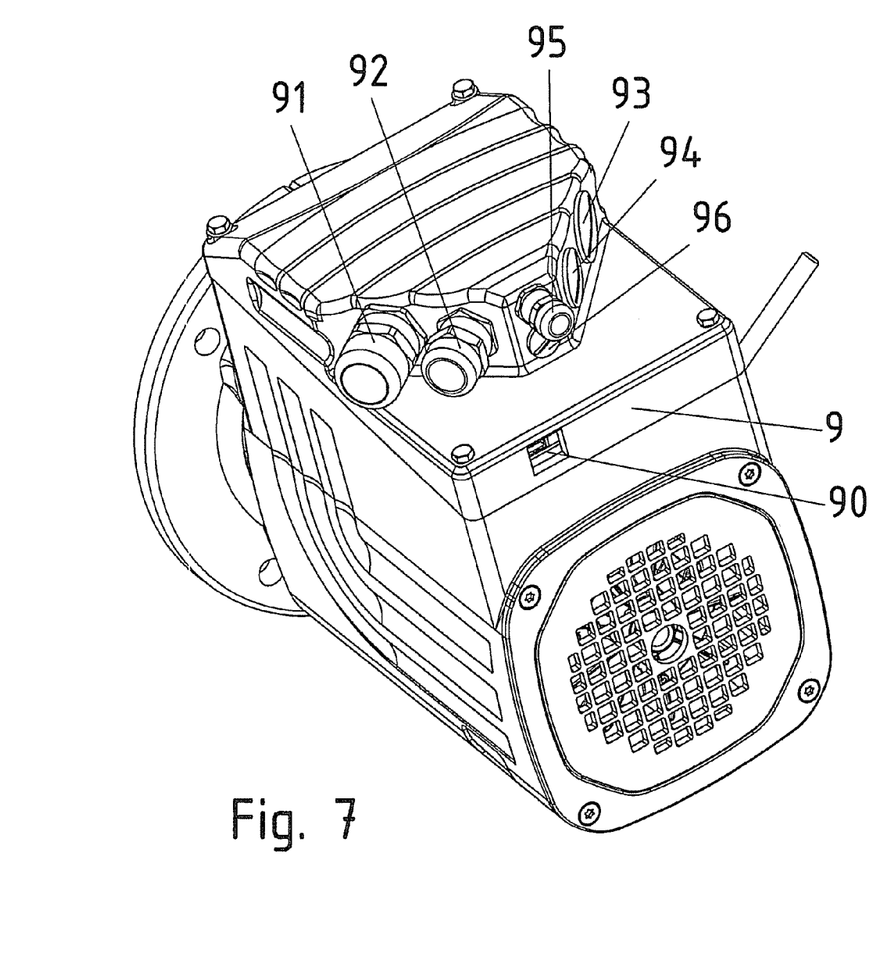
FIG. 7 an oblique view onto a motor connecting box.

FIG. 7 shows a slantwise view of the converter motor of FIG. 6. Connecting box cover 9 forms a bow-shaped step and differs from the connecting box cover of FIGS. 1 to 3 only by an additional opening 90, behind which a USB connection 82 is situated, for reading out operating measured variables.

At the end face of the step, the possible assignments of the openings are shown for cable bushings, as follows: A cable gland 91 for cables having a first diameter, alternatively a cap 93, a cable gland 92 for cables having a second, lesser diameter, alternatively a cap 94, and a cable gland 95 for data cable having a diameter that is once more clearly lesser, and alternatively a cap 96. The arrangement of the cable glands and the caps is only for exemplary purposes, and other combinations are also possible.

It has been shown that, for cables having a first and second diameter, which are designed for power current transmission, one each of the openings on the slantwise sides of the step is sufficient to make possible a cable routing to three sides of the converter motor. While maintaining the admissible bending radius of the cables, the offset of the connecting openings permits a cable routing which does not enlarge the interference contour of the converter motor. In the case of the substantially more flexible data cables, however, one terminal pad is sufficient.

What is claimed is:
1. A motor connecting box, comprising:
 a lower part; and
 an upper part;

wherein a step is formed in the upper part, the step including two plateau surfaces and an end face connecting the plateau surfaces, openings for cable bushings being arranged in the end face of the step;
wherein the step has a plane of symmetry, and, on both sides of the plane of symmetry, openings are provided for cable bushings.

2. The motor connecting box according to claim 1, wherein the openings for the cable bushings point away from the plane of symmetry.

3. A motor connecting box comprising:
a lower part; and
an upper part;
wherein a step is formed in the upper part, the step including two plateau surfaces and an end face connecting the plateau surfaces, openings for cable bushings being arranged in the end face of the step;
wherein the step has a plane of symmetry, and, on both sides of the plane of symmetry, openings are provided for cable bushings;
wherein the openings for the cable bushings point away from the plane of symmetry;
wherein at least one of (a) a first opening for cable bushings is provided in a first planar area of the end face of the step; a mathematical extension of the first planar area intersecting at least two lateral surfaces of the lower part, (b) a second opening for cable bushings is provided in a second planar area of the end face of the step, a mathematical extension of the second planar area intersecting at least two lateral surfaces of the lower part and the mathematical extension of the first planar area, (c) an upper edge being arranged on the lower part, which extends slantwise from a higher end to a lower end, the slanting of the upper edge of the lower part and the step in the upper part having a diminishing height in a same direction.

4. The motor connecting box according to claim 3, wherein a third opening for cable bushings is provided in a third planar area of the end face of the step, the third opening having a lesser diameter than the second opening and the first opening.

5. The motor connecting box according to claim 4, wherein the third planar area is situated between the first planar area and the second planar area.

6. The motor connecting box according to claim 3, wherein the first planar area and the second planar area include an angle having apex points in the direction of the diminishing height of the step.

7. The motor connecting box according to claim 6, wherein the included angle has an angular aperture between 60° and 100°.

8. The motor connecting box according to claim 6, wherein the included angle has an angular aperture of 80°.

9. The motor connecting box according to claim 1, further comprising converter electronics provided in an interior of the motor connecting box.

10. The motor connecting box according to claim 9, wherein the converter electronics include a power component, and at a bottom of the lower part, a planar contact surface is provided, the power component being laid onto the contact surface for the heat dissipation.

11. A motor connecting box comprising:
a lower part;
an upper part; and
converter electronics provided in an interior of the motor connecting box;
wherein a step is formed in the upper part, the step including two plateau surfaces and an end face connecting the plateau surfaces, openings for cable bushings being arranged in the end face of the step;
wherein the converter electronics include a power component, and at a bottom of the lower part, a planar contact surface is provided, the power component being laid onto the contact surface for the heat dissipation;
wherein the power component is situated on a printed circuit board, the printed circuit board pressing the power component onto the contact surface.

12. The motor connecting box according to claim 11, further comprising a fastening frame on which the printed circuit board is fastened and which covers the printed circuit board from above, openings being provided in the fastening frame through which plug connector parts of the printed circuit board extend.

13. The motor connecting box according to claim 12, wherein at least one of (a) the fastening frame is screwed to the lower part pressing the printed circuit board against a bottom of the lower part and (b) the fastening frame having a rim, an additional printed circuit board being clipped onto the rim.

14. The motor connecting box according to claim 13, wherein the rim includes springy tabs having lugs, the additional printed circuit board being clipped onto the rim into the tabs having the lugs.

15. The motor connecting box according to claim 13, wherein at least one of (a) the additional printed circuit board is connected to a plug connector of the printed circuit board via a fitting plug connector and (b) at least one of (i) an intermediate circuit capacitor and (ii) a rectifier module is situated on the additional printed circuit board, in a region that is surrounded at least partially by the higher end of the lower part.

16. A motor connecting box, comprising:
a lower part; and
an upper part;
wherein a step is formed in the upper part, the step including two plateau surfaces and an end face connecting the plateau surfaces, openings for cable bushings being arranged in the end face of the step;
wherein the step in the upper part, on the inside of the motor connecting box, forms a region in which an at least one of (a) an intermediate circuit capacitor and (b) a rectifier module of converter electronics is situated.

17. The motor connecting box according to claim 1, wherein an outer tubular part is provided on the lower part and adapted to accommodate a motor unit, a bottom of the lower part forming a part of the outer tubular part.

18. The motor connecting box according to claim 17, wherein an inner tubular part is arranged in the outer tubular part and adapted to accommodate a stator of a motor unit, an axis of the outer tubular part extending parallel to an axis of the inner tubular part.

19. The motor connecting box according to claim 18, wherein the slanting of the upper edge of the lower part has a diminishing height in a direction of the axis of the outer tubular part.

20. The motor connecting box according to claim 17, wherein the lower part and the outer tubular part are produced from one cast body.

21. The motor connecting box according to claim 20, wherein the outer tubular part and the inner tubular part are produced from one cast body.

22. A converter motor, comprising:
an inner tubular part surrounding a stator;
an outer tubular part surrounding the inner tubular part; and a motor connecting box arranged on an outer side of the outer tubular part, the motor connecting box including:
a lower part; and
an upper part, a step being formed in the upper part, the step including two plateau surfaces and an end face connecting the plateau surfaces, openings for cable bushings being arranged in the end face of the step;
wherein at least one of: (a) a ventilator is arranged in the outer tubular part and adapted to move air along a inside of the outer tubular part; (b) a slanting of an upper edge of the lower part has a diminishing height in a direction of an axis of the outer tubular part; (c) a region of great height is situated on a drive side of the converter motor; (d) a contactless power supply is provided; and (e) a motor shaft is situated in a plane of symmetry of the motor connecting box.

* * * * *